(12) United States Patent
Saby et al.

(10) Patent No.: US 10,243,513 B2
(45) Date of Patent: Mar. 26, 2019

(54) SYSTEM COMPRISING A PHOTOVOLTAIC CELL AND A LUMINOUS INTENSITY MEASURING DEVICE AND METHOD FOR MEASURING LUMINOUS INTENSITY RECEIVED BY THE PHOTOVOLTAIC CELL

(71) Applicant: EM Microelectronic-Marin S.A., Marin (CH)

(72) Inventors: Jerome Saby, Neuchatel (CH); Yves Theoduloz, Yverdon (CH); Cyril Marti, Lignieres (CH)

(73) Assignee: EM Microelectronic-Marin SA, Marin (CH)

( * ) Notice: Subject to any disclaimer, the term of this patent is extended or adjusted under 35 U.S.C. 154(b) by 381 days.

(21) Appl. No.: 15/174,088

(22) Filed: Jun. 6, 2016

(65) Prior Publication Data

US 2016/0365833 A1 Dec. 15, 2016

(30) Foreign Application Priority Data

Jun. 10, 2015 (EP) .................................. 15171527

(51) Int. Cl.
*H02S 50/10* (2014.01)
*G01J 1/44* (2006.01)
(Continued)

(52) U.S. Cl.
CPC ............... *H02S 50/10* (2014.12); *G01J 1/44* (2013.01); *H02J 7/0052* (2013.01); *H02J 7/35* (2013.01);
(Continued)

(58) Field of Classification Search
CPC .......... H02S 50/10; H02S 50/15; H02S 50/00; G01J 1/44; G01J 2001/4266; Y02E 10/566
See application file for complete search history.

(56) References Cited

U.S. PATENT DOCUMENTS

| | | |
|---|---|---|
| 2008/0224652 A1 | 9/2008 | Zhu et al. |
| 2011/0006194 A1 | 1/2011 | Pereira Morais Dos Santos et al. |
| 2011/0056533 A1* | 3/2011 | Kuan ................ H01L 31/02021 136/244 |

FOREIGN PATENT DOCUMENTS

| | | |
|---|---|---|
| EP | 1 925 923 A2 | 5/2008 |
| WO | WO 2007/010326 A1 | 1/2007 |
| WO | WO 2009/088310 A1 | 7/2009 |

OTHER PUBLICATIONS

European Search Report dated Nov. 13, 2015 in European Application 15171527, filed on Jun. 10, 2015 (with English Translation).

* cited by examiner

*Primary Examiner* — Georgia Y Epps
*Assistant Examiner* — Don Williams
(74) *Attorney, Agent, or Firm* — Oblon, McClelland, Maier & Neustadt, L.L.P.

(57) ABSTRACT

The measuring device determines the luminous intensity received by a photovoltaic cell electrically connected at output to an electrical energy storage unit via a DC-DC converter and to an external capacitor arranged in parallel to the DC-DC converter. It includes:
- a variable resistor arranged between an input terminal and an earth terminal;
- a control unit arranged to vary the value of the variable resistor within a plurality of determined resistance values;
- a discharge unit for the external capacitor controlled by the control unit so as to discharge said external capacitor to a reference voltage; and
- a photovoltaic cell voltage change detector which is arranged to be capable of determining, when a measurement is made, whether the voltage at said input
(Continued)

terminal increases or decreases between two instants separated by a given time interval.

10 Claims, 3 Drawing Sheets

(51) Int. Cl.
    *H02S 50/00*         (2014.01)
    *H02J 7/35*          (2006.01)
    *H02S 50/15*         (2014.01)
    *H02J 7/00*          (2006.01)
    *G01J 1/42*          (2006.01)

(52) U.S. Cl.
    CPC .............. *H02S 50/00* (2013.01); *H02S 50/15* (2014.12); *G01J 2001/4266* (2013.01); *H02J 2007/0059* (2013.01); *Y02E 10/566* (2013.01)

SYSTEM COMPRISING A PHOTOVOLTAIC CELL AND A LUMINOUS INTENSITY MEASURING DEVICE AND METHOD FOR MEASURING LUMINOUS INTENSITY RECEIVED BY THE PHOTOVOLTAIC CELL

This application claims priority from European Patent Application No. 15171527.3 filed Jun. 10, 2015, the entire disclosure of which is incorporated herein by reference.

FIELD OF THE INVENTION

The invention concerns a system comprising a photovoltaic cell, a unit for storing the electrical energy received by the photovoltaic cell, a DC-DC converter arranged between the photovoltaic cell and the storage unit and with an external input capacitor arranged in parallel to the DC-DC converter.

More specifically, the present invention concerns a device for measuring the luminous intensity received by a photovoltaic cell whose primary function is the production of electrical energy, the photovoltaic cell being connected for this purpose to an electrical energy storage unit. Such a device is also called a luxmeter.

The invention also concerns a method for measuring the luminous intensity received by a photovoltaic cell electrically connected at output to an electrical energy storage unit via a DC-DC converter and to an external capacitor arranged in parallel to the DC-DC converter.

BACKGROUND OF THE INVENTION

Several types of luxmeters are known to those skilled in the art. A first type contains a photoconductive light sensor. The problem with this solution is the non-linearity of the voltage across the sensor terminals as a function of the light received. Another type uses a photodiode or phototransistor.

In a system incorporating a photovoltaic cell as the electrical energy source, it is advantageous to avoid adding a specific sensor for measuring light intensity. Indeed, it is known to use a photovoltaic cell in a luxmeter. The problem is to perform such a measurement accurately and without diminishing the charging efficiency of an element for storing the electrical energy provided by the photovoltaic cell. A relatively simple solution would be to measure the open-circuit voltage (output voltage at which the photovoltaic cell delivers no current), but such a solution gives an inaccurate result since the open-circuit voltage varies little as a function of the received luminous intensity and moreover this variation is not linear as a function of luminous intensity.

A luminous intensity measurement via the photovoltaic cell raises a technical problem, given the conditions of a system performing with one or more photovoltaic cells. Such a system includes a storage element (storage capacitor or battery) connected to the output terminal of the photovoltaic cell via a DC-DC converter having an external input capacitor arranged in parallel. This external capacitor generally has a relatively high value, notably several microfarads. It is necessary for the proper efficiency of the converter. Next, the solar cell can generally generate an electrical current over a wide range, notably from several microamperes to several milliamperes. Further, in order to perform a luminous intensity measurement, it is preferable for the measurement to be made in quite a short time interval, for example less than 100 milliseconds (100 ms).

SUMMARY OF THE INVENTION

It is an object of the present invention to propose a device (luxmeter) for measuring the luminous intensity received by a photovoltaic cell, used to electrically power an electronic device (for example a watch or a mobile phone), which is accurate, efficient and which disrupts as little as possible the electrical power efficiency of the light energy collection system that incorporates the photovoltaic cell used as the electrical energy source and also as a sensor for the luxmeter.

Within the scope of the present invention, the inventors first sought a physical variable that could advantageously be considered for measuring light intensity. Although the open-circuit voltage is not a good contender, it appears that the short-circuit current of a photovoltaic cell can provide good information about the luminous intensity that it receives. Indeed, the short-circuit current varies substantially linearly with luminous intensity.

The present invention proposes a device for measuring the luminous intensity received by a photovoltaic cell according to claim 1 of the present Patent Application. It also proposes a system according to claim 4 comprising such a measuring device and a photovoltaic cell having an output terminal connected in parallel to a DC-DC converter, to an external capacitor and to the measuring device. Finally, the present invention proposes a method for measuring the luminous intensity received by a photovoltaic cell according to the independent claim 6. Various advantageous variants form the subject of the dependent claims.

As a result of the features of the invention, the electrical efficiency of a storage device powered by the photovoltaic cell is virtually undiminished by the measuring device proposed, notably owing to the fact that there is no resistive element, for example a switch, arranged between the photovoltaic cell output terminal and the DC-DC converter input to perform the luminous intensity measurement. Next, as a result of the external capacitor discharge unit, which is advantageously arranged to discharge the external capacitor through a low value resistor, in particular that of a transistor switch, it is possible to quickly make the voltage across the capacitor terminals drop to a relatively low reference voltage, in order to detect a photovoltaic cell output current close to or substantially equal to the short-circuit current which varies linearly with luminous intensity. Thus, the measuring method can be accomplished in a relatively short period without interrupting the electrical connection between the output terminal of the photovoltaic cell and the external capacitor.

BRIEF DESCRIPTION OF THE DRAWINGS

The invention will be described below with reference to the annexed drawings, given by way of non-limiting example, and in which.

DETAILED DESCRIPTION OF THE INVENTION

Figure 1:
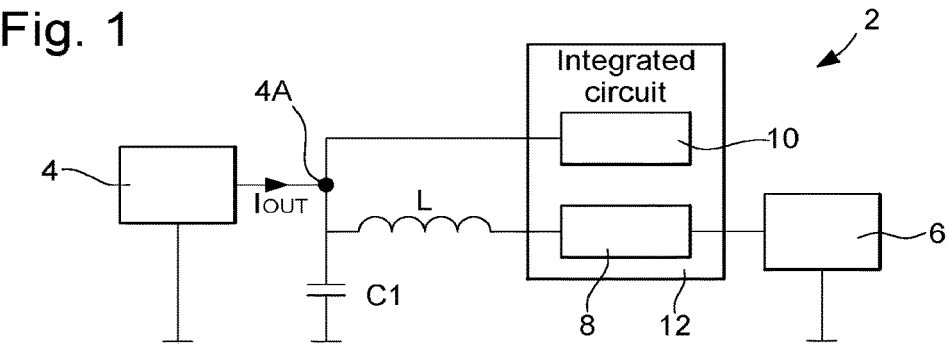
FIG. 1 shows a schematic view of a general embodiment of a system incorporating a photovoltaic cell and a circuit for measuring the luminous intensity received by the photovoltaic cell.
Figure 2:
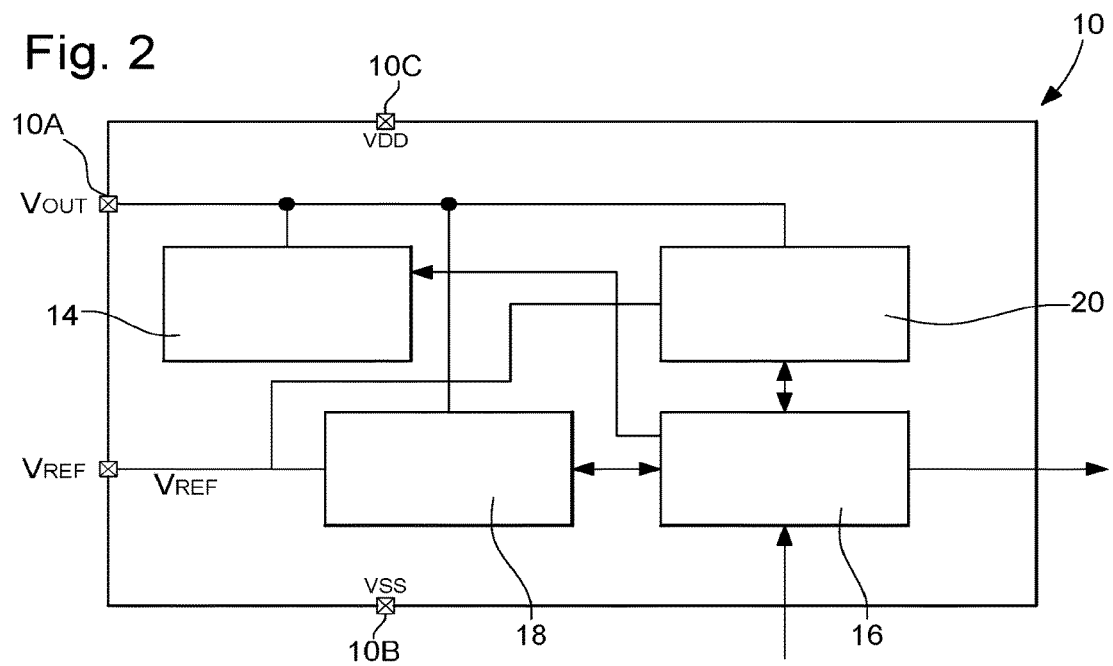
FIG. 2 is a flow diagram of the luminous intensity measurement circuit.
Figure 3:
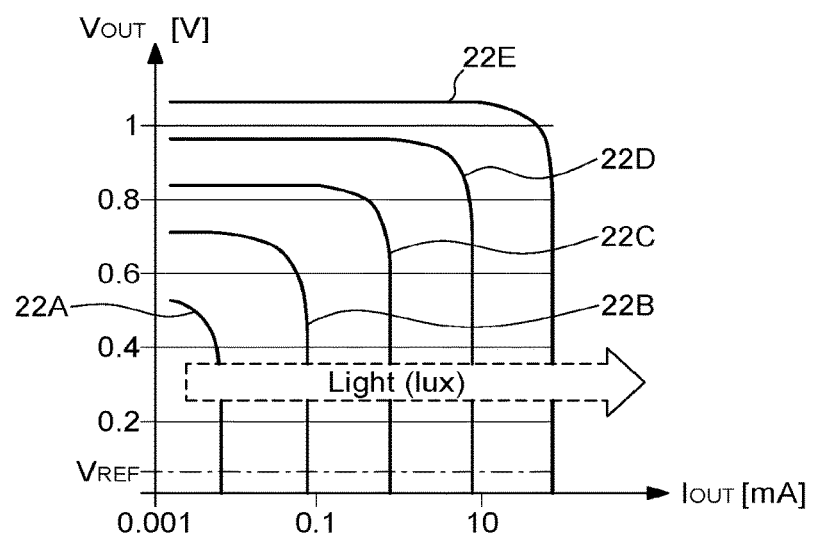
FIG. 3 shows graphs of the output voltage as a function of the photovoltaic cell output current for various luminous intensities.

With reference to FIGS. 1 to 3, there will be described below a general embodiment of a system for collecting light energy 2 comprising a photovoltaic cell 4 whose output is electrically connected to an electrical energy storage unit 6 via a DC-DC converter 8 and to an external capacitor C1 arranged in parallel to the DC-DC converter. This system 2 further includes, according to the invention, a device 10 for measuring the luminous intensity received by the photovoltaic cell. Preferably, the measuring device and converter 8 are incorporated tin the same integrated circuit 12. It will be noted, however, that, in other variants, the measuring device is formed by an integrated circuit distinct from the converter.

The input terminal 10A of measuring device 10 is connected to an output terminal 4A of photovoltaic cell 4 in parallel to the DC-DC converter and to the external capacitor C1.

Measuring device 10 includes:
a variable resistor 14 arranged between said measuring device input terminal 10A and the earth terminal VSS, referenced 10B,
a control unit 16 arranged for varying the value of variable resistor 14 within a plurality of determined resistance values;
a discharge unit 18 for external capacitor C1; this discharge unit is controlled by the control unit so as to discharge said external capacitor until the voltage at the external capacitor terminals is substantially equal to a reference voltage $V_{REF}$; and
a voltage change detector 20 for the photovoltaic cell output voltage $V_{OUT}$ supplied to the measuring device input; this detector is controlled by control unit 16 and arranged to be capable of determining, when a measurement is made, whether the voltage at input terminal 10A has increased or decreased between two instants separated by a given time interval.

Control unit 16 is arranged to determine, within a plurality of resistance values of variable resistor 14, successive first and second resistance values at which the output voltage $V_{OUT}$ change detector respectively detects a decrease in voltage and an increase in voltage at input terminal 10A, or, if appropriate, to determine whether the current $I_{OUT}$ provided by the photovoltaic cell is either lower than reference voltage $V_{REF}$ divided by the maximum value of the plurality of resistance values of the variable resistor, or higher than the reference voltage divided by the minimum value of said plurality of resistance values.

Measuring device 10 is thus arranged to determine in which current range lies the value of current $V_{REF}$, provided by the photovoltaic cell at the reference voltage, from a plurality of determined current ranges. This device is supplied with a supply voltage VDD, referenced 10C and provided by storage element 6. Reference voltage $V_{REF}$ is preferably chosen to be low enough for current $I_{OUT}$, provided by photovoltaic cell 4 at the reference voltage, to be close or substantially equal to the short-circuit current of the photovoltaic cell. In this latter case, it is known that this current value is theoretically a linear function of the luminous intensity received by the photovoltaic cell, so that these current ranges define corresponding luminous intensity ranges whose extreme values are linearly dependent on the extreme values of the aforementioned current ranges. It will be noted, however, that in a less favourable variant, the reference voltage may be higher. Indeed, although linear dependence is an advantage, it is not a necessity, given that it is desired to indicate a luminous intensity level. If, however, it is desired to provide very accurate luminous intensity information, knowledge of the characteristic $I_{OUT}$ as a function of current $I_{OUT}$ and of luminous intensity, for the photovoltaic cell incorporated in the system concerned, can provide such a result by means of an algorithm implemented in the control circuit or in an additional processing circuit.

In a non-limiting example embodiment, for a photovoltaic cell substantially exhibiting the characteristic curves 22A to 22EE of FIG. 3 respectively for luminous intensities whose respective values are $10^n$ lux, n=1 to 5, where current $I_{OUT}$ can vary in a wide range of values from one microampere to several milliamperes (the scale of current $I_{OUT}$ is a logarithmic scale here), there is obtained:
an external capacitor C1 of several microfarads, whose value is notably comprised between 4 µF and 12 µF;
a variable resistor 14 formed of a plurality of resistors $R_m$, m=1 á 8, where $R_1$=7 kΩ and $R_{m+1}$=$R_m$/2;
a reference voltage $V_{REF}$=70 mV.

In a particular variant, the value of external capacitor C1 is higher than or substantially equal to one microfarad (1 µF) and the maximum value of the plurality of resistance values is higher than or substantially equal to one kilo-Ohm (1 kΩ). In another particular variant, there is a plurality of $R_m$, m=1 to 16, where $R_1$=70 kΩ and $R_{m+1}$=$R_m$/2; In a particular variant, the reference voltage is selected such that its order of magnitude is one tenth of the mean open-circuit voltage ($I_{OUT}$=0) of the photovoltaic cell in the general luminous intensity range detected by the measuring device. For example, for a mean open-circuit voltage comprised between one and two volts (1-2 V), the reference voltage is between 50 mV and 250 mV.

Figure 4:
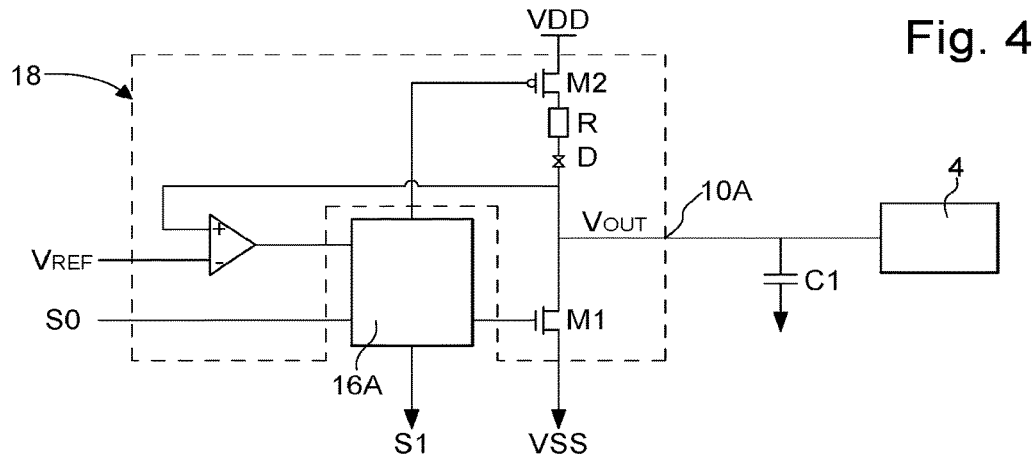
FIG. 4 is an embodiment of a charge/discharge unit for the external capacitor comprised in a variant of the measurement circuit of FIG. 2.

According to a preferred embodiment, discharge unit 18 is also arranged to charge external capacitor C1 in the event that the initial voltage across the external capacitor terminals is lower than the reference voltage. In such case, the discharge unit thus forms a charge-discharge unit 18. The discharge function is important to enable a fast luminous intensity measurement to be made, notably in a period of less than 100 milliseconds, despite the presence of an external capacitor C1 of several microfarads Indeed, in a preferred variant shown in FIG. 4, charge-discharge unit 18 includes a switch arranged between input terminal 10A and earth terminal VSS; this switch is formed by a transistor M1 controlled by the control unit (unit 16A) so that the transistor can be either conductive, or non-conductive. The control unit is arranged to switch the transistor from a conductive state to a non-conductive state in a step of discharging external capacitor C1 and to make the transistor non-conductive again once the voltage at the external capacitor terminals is substantially equal to reference voltage $V_{REF}$; this instant is determined with the aid of a comparator receiving $V_{OUT}$ and $V_{REF}$ across its two inputs. The advantage of using a transistor in the discharge unit is that it has very low resistance in the "ON" state, for example 10Ω. Thus the time constant RC is relatively low; which allows the low voltage reference to be reached quickly even when the initial voltage of the external capacitor, and thus the initial voltage at the photovoltaic cell terminals, is relatively high.

In a less efficient variant, the smallest resistance value of variable resistor 14 may, however, be used. In addition to the discharge path for external capacitor C1 through transistor M1 during a luminous intensity measurement, there is an external capacitor charge path which is important for implementing a dichotomy algorithm, which will be explained hereinafter. This charge path is arranged between terminal 10A and positive supply voltage VDD and it includes a switch formed by a transistor M2 arranged in series with a charging current limiting resistor R and a diode D. The control unit (unit 16A) is arranged to switch transistor M2 from a conductive state to a non-conductive state in an external capacitor C1 charging step and to make the transistor non-conductive again once the voltage at the external capacitor terminals is substantially equal to reference voltage $V_{REF}$.

Figure 5:
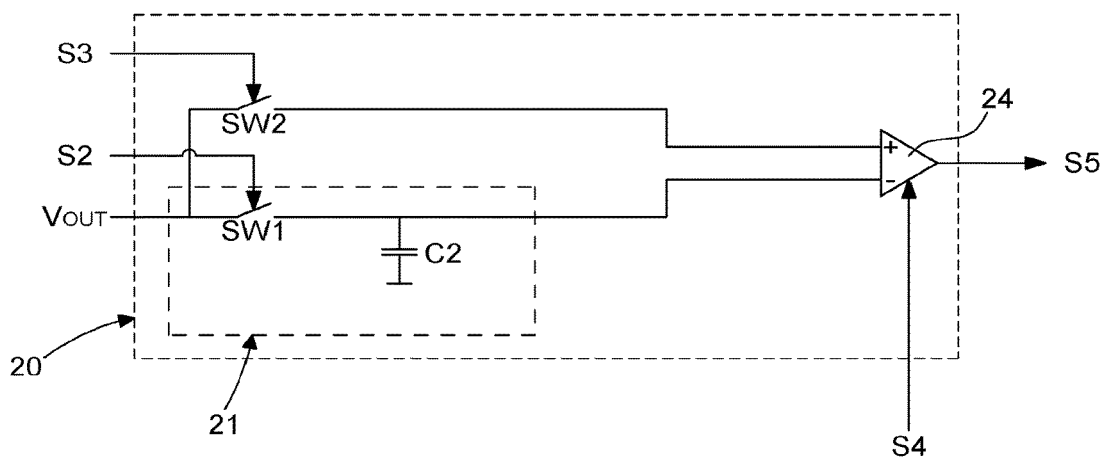
FIG. 5 is an embodiment of a voltage change detector at the photovoltaic cell output which is arranged in a variant of the luminous intensity measurement circuit of FIG. 2.

FIG. 5 shows an embodiment of voltage change detector 20 for output voltage $V_{OUT}$ of photovoltaic cell 4. This detector 20 thus receive at input the voltage $V_{OUT}$ present at measuring device input terminal 10A. It is essentially formed of four elements: A first switch SW1 controlled by a signal S2, a capacitor C2 forming, with switch SW1, a memory cell 21 for voltage $V_{OUT}$, a second switch SW2 controlled by a signal S3 and a comparator 24 actuated by a signal S5 and whose two inputs are respectively connected to the output terminals of the two switches SW1 and SW2. The input terminals of these two switches are connected to input terminal 10A. Signals S2, S3 and S4 are provided by control unit 16. Detector 20 outputs a binary signal S5 indicating whether the comparison result by comparator 24 is positive or negative. A positive signal indicates an increase in voltage $V_{OUT}$, whereas a negative signal indicates a decrease in voltage $V_{OUT}$, since switch SW2 is activated (made conductive) in a subsequent period to that when switch SW1 is activated.

Figure 6:
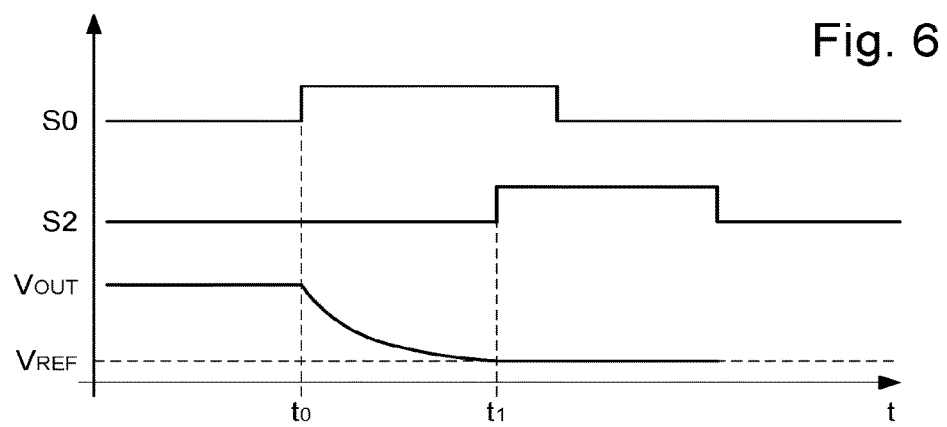
FIG. 6 shows time graphs for the control signals and output signal of the charge/discharge unit of FIG. 4.
Figure 7:
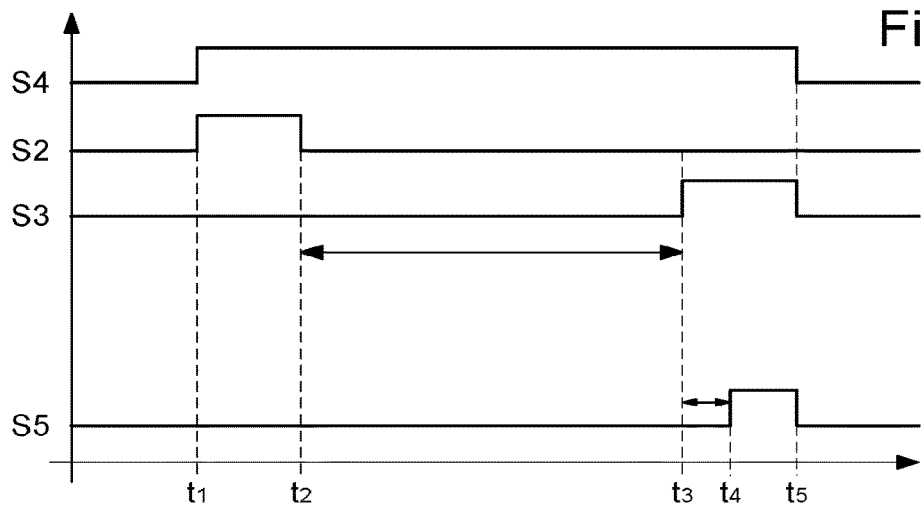
FIG. 7 shows time graphs for the control signals and output signal of the voltage change detector of FIG. 5.

With reference to FIGS. 6 and 7, the operation of units 18 and 20 and their interaction will be described. Logic unit 16A receives a cycle start signal S0 occurring in a luminous intensity measurement. If voltage $V_{OUT}$ is initially higher than the reference voltage, as shown in FIG. 6, signal S0 makes transistor M1 conductive at time $t_0$ to quickly discharge capacitor C1 until its voltage substantially reaches the reference voltage. At that time, the comparator indicates this event to logic unit 16A. The logic unit then makes transistor M1 non-conductive and simultaneously sends a signal S1 at time $t_1$ to the central unit of control unit 16. Reception of this signal immediately actuates unit 20 substantially at time $t_1$, as shown in FIG. 7. The control unit then sends a signal S2 to unit 20 to close switch SW1, so as to charge capacitor C2 at the reference voltage, and a signal S4 to actuate comparator 24. After a certain time interval, switch SW1 is opened again at time $t_2$ and voltage $V_{OUT}$, substantially equal to voltage $V_{REF}$, is temporarily stored in capacitor C2. Next, after selecting a resistance value for variable resistor 14, the control unit allows the system to change for a certain time period until time $t_3$ when it closes switch SW2, so that comparator 24 then receives at input the voltage at the terminals of capacitor C2 substantially equal to $V_{REF}$ and voltage $V_{OUT}$ after time $t_3$. After a comparison completion time interval, the comparator supplies, at instant $t_4$ a signal S5 indicating the comparison result to control unit 16, which stores this result in time interval $t_4$-$t_5$. Next, the control unit deactivates unit 20 at instant $t_5$ thereby ending the measurement cycle.

Figure 8:
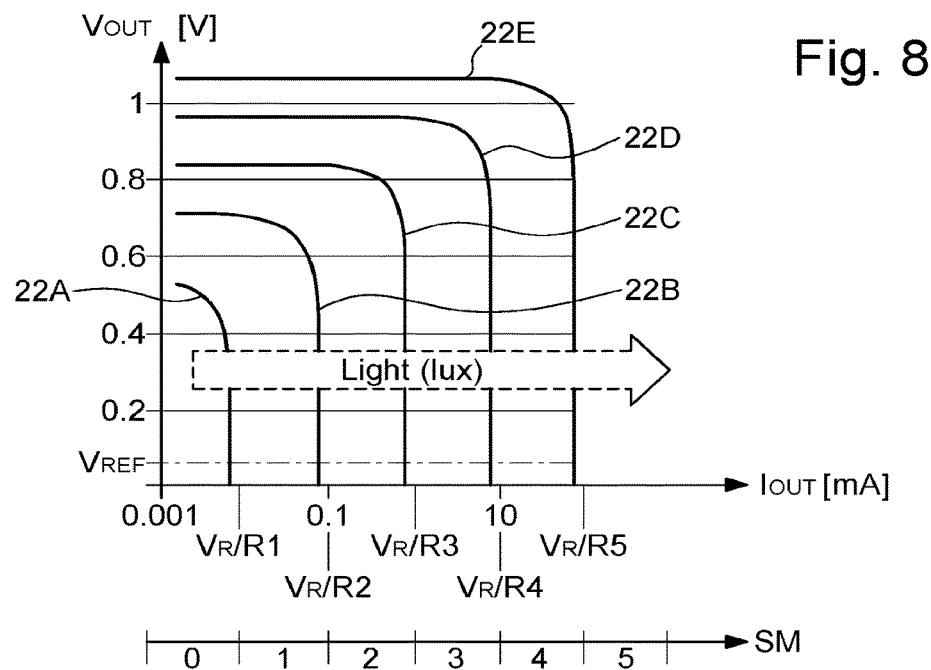
FIG. 8 shows a plurality of luminous intensity ranges defined by various resistance values within a plurality of resistance values taken by a variable resistor arranged in a variant of the luminous intensity measurement circuit of FIG. 2.

The measuring device of the invention is arranged to determine any two successive values within the plurality of resistance values of the variable resistor which define a respective current range for the current delivered by the photovoltaic cell at the reference voltage, each of the current ranges thus defining a respective value range for the luminous intensity that can be received or captured by the photovoltaic cell, as shown in FIG. 8. The measuring device is arranged to determine which luminous intensity range corresponds to the value of the luminous intensity received or captured by the photovoltaic cell and to indicate this information SM by means of a display which is associated with the measuring device.

There will be described hereinafter the operation of the measuring device of the invention and in particular a luminous intensity measurement method, which is also the subject of the present invention. This method measures the luminous intensity received by a photovoltaic cell whose output is electrically connected to an electrical energy storage unit via a DC-DC converter and to an external capacitor arranged in parallel to the DC-DC converter, as described above. This measurement method is preferably implemented by means of a luminous intensity measuring device, whose input terminal is connected to an output terminal of the photovoltaic cell in parallel to the DC-DC converter and to the external capacitor, as described above.

Generally, the measurement method includes the following steps:

A) Connecting a variable resistor 14 between input terminal 10A of measuring device 10 and an earth terminal 10B, this variable resistor being arranged to take various values within a plurality of determined resistance values and being programmed by a control unit 16 of the measuring device; and selecting an initial resistance value.

B) Discharging or charging the external capacitor C1 if the voltage across the external capacitor terminals is higher than a reference voltage $V_{REF}$, respectively lower than said reference voltage $V_{REF}$, until the voltage across the terminals of external capacitor C1 is substantially equal to the reference voltage.

C) Determining whether the input terminal voltage increases or decreases between a first instant, when the voltage is substantially equal to the reference voltage following step B), and a second subsequent instant given by the control unit.

D) Repeating steps B) and C), either decreasing the value of the variable resistor if the result from step C) in a preceding iteration indicates an increase in voltage at the input terminal and if the value of the variable resistor in the preceding iteration did not correspond to the minimum value of the plurality of resistance values, or increasing the value of the variable resistor if the result from step C) in a preceding iteration indicates a decrease in voltage at the input terminal and if the value of the variable resistor in the preceding iteration did not correspond to the maximum value of the plurality of resistance values, and performing step D) until the determination, within said plurality of resistance values, of a successive first resistance value and second resistance value at which said output voltage change detector respectively detects a decrease in voltage and an increase in voltage at said input terminal, or, if appropriate, until it is determined that the current supplied by the photovoltaic cell to said output terminal is either lower than the reference voltage divided by the maximum value of the plurality of resistance values, or higher than the reference voltage divided by the minimum value of said plurality of resistance values.

In a preferred variant, the reference voltage is arranged to be sufficiently low for the current supplied by the photovoltaic cell at the reference voltage to be close or substantially equal to the short-circuit current of the photovoltaic cell.

There will be described hereinafter, with reference to FIG. 9, a specific implementation of the measuring method according to the invention wherein a dichotomy algorithm is implemented to select the initial resistance value and during successive resistance value selections in the aforementioned step D). The measuring method is devised to determine any two successive values within the plurality of resistance values defining a respective current range for the current supplied by the photovoltaic cell at the reference voltage, each of the current ranges thus defining a range of values for the luminous intensity that can be received or captured by the photovoltaic cell. The measuring method determines the range of values corresponding to the luminous intensity actually received or captured by the photovoltaic cell. If the measuring method determines that the current supplied by the photovoltaic cell is either lower than voltage $V_{REF}$ divided by the maximum value of the plurality of resistance values, or higher than voltage $V_{REF}$ divided by the minimum value of said plurality of resistance values, it concludes that the luminous intensity received or captured has a value lying within a lower end range, respectively an upper end range.

Figure 9:
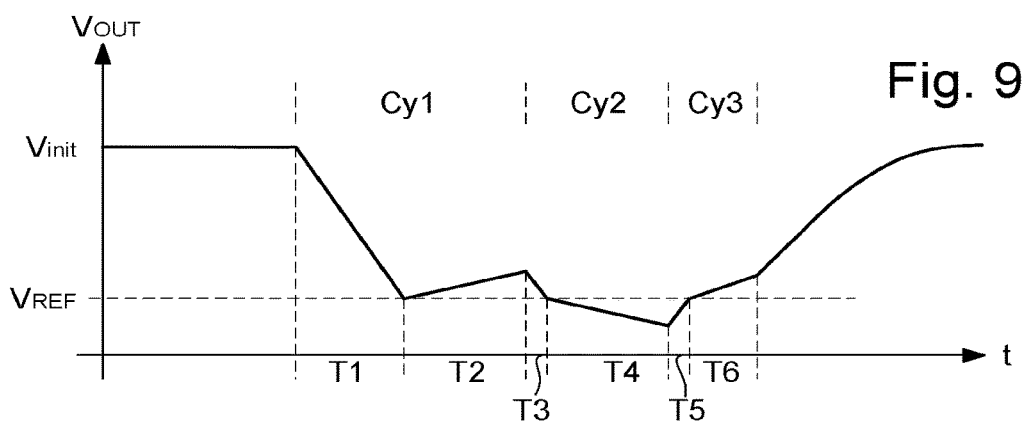
FIG. 9 is a time graph of the change in the output voltage of a photovoltaic cell, whose received luminous intensity is measured, in an implementation of a method for measuring the luminous intensity received by such a photovoltaic cell.

The FIG. 9 graph schematically shows the change in output voltage $V_{OUT}$ during a measurement implementing a dichotomy algorithm in the case of a variable resistor with eight resistors ($R_n$, n=1 to 8; $R_{n+1} < R_n$). Voltage $V_{OUT}$ generally has a higher initial voltage than voltage $V_{REF}$. During a first cycle Cy1, voltage $V_{OUT}$ is lowered to voltage $V_{REF}$ during a first period T1 with the aid of unit 18. Next, middle resistor $R_4$ is selected and unit 20 is activated in period T2. As explained previously, in the final phase of this period T2, the measuring device detected that voltage $V_{OUT}$ increased during period T2. It deduces therefrom that the current $I_{OUT}$ supplied by the photovoltaic cell is higher than a reference current defined by $V_{REF}/R4$ and thus that resistor R4 is too high. A second cycle Cy2, similar to the first cycle, is then provided with resistor R6 selected. During a short period T3, voltage $V_{OUT}$ is again returned to voltage $V_{REF}$ by unit 18 and unit 20 is then activated during period T4, and unit 20 again determines the change in voltage during this period T4. In a final phase of period T4, the measuring device detected that voltage $V_{OUT}$ decreased during period T4 and deduces therefrom that current $I_{OUT}$ is lower than a reference current defined by $V_{REF}/R6$, and therefore that resistor R6 is too low. A third and final cycle Cy3, similar to the second cycle is then provided with resistor R5 selected. This final cycle, comprising periods T5 and T6 similar to periods T3 and T4, indicates that the voltage has changed positively again so that the current $I_{OUT}$ supplied by the photovoltaic cell is higher than a reference current defined by $V_{REF}/R5$, and therefore that resistor R5 is too high. The measuring device then finishes the luminous intensity measurement indicating that current $V_{OUT}$ thus lies in a range between reference currents $V_{REF}/R5$ and $V_{REF}/R6$, this range corresponding to a given luminous intensity range for the photovoltaic cell.

Finally, a particular embodiment provides that, following the measuring method described above, the value of the current $I_{OUT}$ supplied by the photovoltaic cell is accurately determined. To this end, the measuring device selects the successive first resistance value or second resistance value of the variable resistor determined during the preceding measurement (in the above example, resistor R5 or R6) and leaves the variable resistor connected to input terminal 10A. After a certain time interval allowing the system to return to steady state, it accurately measures voltage $V_{OUT}$ by means of an ND converter (analogue-to-digital) and thus accurately determines the value of current $I_{OUT}$, which substantially corresponds to the short circuit current, and then the value of the luminous intensity received using the linear characteristic of luminous intensity as a function of the short circuit current for the photovoltaic cell concerned.

What is claimed is:

1. A device for measuring the luminous intensity received by a photovoltaic cell which has an output terminal electrically connected to an electrical energy storage unit via a DC-DC converter and to an external capacitor arranged in parallel to said DC-DC converter, wherein said measuring device has an input terminal intended to be connected to said output terminal of the photovoltaic cell in parallel to the DC-DC converter and to the external capacitor, said measuring device including:
    a variable resistor arranged between said measuring device input terminal and an earth terminal;
    a control unit arranged to vary the value of the variable resistor within a plurality of determined resistance values;
    a discharge unit for the external capacitor controlled by the control unit so as to discharge said external capacitor until the voltage across the external capacitor terminals is substantially equal to a reference voltage; and
    a voltage change detector for the voltage at said input terminal corresponding to the photovoltaic cell output voltage, said detector being controlled by the control unit and arranged to be capable of determining, when a measurement is made, whether the voltage at the input terminal increases or decreases between two instants separated by a given time interval;
    and wherein the control unit is arranged to determine, within said plurality of resistance values, successive first and second resistance values at which the voltage change detector at said input terminal respectively detects a decrease in voltage and an increase in voltage at said input terminal, or, if appropriate, to determine whether the current supplied by the photovoltaic cell to said output terminal is either lower than the reference voltage divided by the maximum value of the plurality of resistance values, or higher than the reference voltage divided by the minimum value of said plurality of resistance values.

2. The measuring device according to claim 1, wherein said a charge-discharge unit includes a switch arranged between said input terminal and said earth terminal, said switch being formed by a transistor controlled by said control unit such that said transistor can be either conductive, or non-conductive, and wherein the control unit is arranged to switch said transistor from a conductive state to a non-conductive state in a step of discharging the external capacitor via said measuring device, and to make said transistor non-conductive again once the voltage at said input terminal, corresponding to the voltage across the external capacitor terminals, is substantially equal to said reference voltage.

3. The measuring device according to claim 1, wherein said discharge unit is also arranged to charge said external capacitor if the voltage at said input terminal, corresponding to an initial voltage across said external capacitor terminals, is lower than said reference voltage, said discharge unit thus forming a charge-discharge unit.

4. A system comprising the measuring device according to claim 1, a photovoltaic cell, a DC-DC converter and an external capacitor, the measuring device having an input terminal connected to an output terminal of the photovoltaic cell in parallel to the DC-DC converter and to the external capacitor, wherein said reference voltage is arranged to be sufficiently low for the current supplied by the photovoltaic cell at said reference voltage to be close or substantially equal to the short-circuit current of said photovoltaic cell.

5. The system according to claim 4, wherein any two successive values within said plurality of resistance values define a respective current range for the current able to be supplied by the photovoltaic cell at the reference voltage, each of the current ranges thus defining a range of values for the luminous intensity able to be received or captured by the photovoltaic cell; and wherein said measuring device is arranged to determine which value range corresponds to the luminous intensity actually received or captured by the photovoltaic cell.

6. A method for measuring the luminous intensity received by a photovoltaic cell whose output is electrically connected to an electrical energy storage unit via a DC-DC converter and to an external capacitor arranged in parallel to said DC-DC converter, said measuring method being implemented by means of a device for measuring said luminous intensity, whose input terminal is connected to an output terminal of the photovoltaic cell in parallel to the DC-DC converter and to the external capacitor; said measuring method including the following steps:
  A) Connecting a variable resistor between said input terminal of the measuring device and an earth terminal, said variable resistor being arranged to take various values within a plurality of determined resistance values and being programmed by a control unit of the measuring device, and selecting an initial resistance value;
  B) Discharging or charging the external capacitor if the voltage across the external capacitor terminals is higher than a reference voltage, respectively lower than said reference voltage, until the voltage across the terminals of external capacitor is substantially equal to the reference voltage;
  C) Determining whether said input terminal voltage increases or decreases between a first instant, when said voltage is substantially equal to the reference voltage following step B), and a second subsequent instant given said control unit;
  D) Repeating steps B) and C), either decreasing the value of the variable resistor if the result from step C) in a preceding iteration indicates an increase in said voltage at the input terminal and if the value of the variable resistor in the preceding iteration did not correspond to the minimum value of said plurality of resistance values, or increasing the value of the variable resistor if the result from step C) in a preceding iteration indicates a decrease in voltage at the input terminal and if the value of the variable resistor in the preceding iteration did not correspond to the maximum value of the plurality of resistance values, and performing step D) until the determination, within said plurality of resistance values, of a successive first resistance value and second resistance value at which a output voltage change detector respectively detects a decrease in voltage and an increase in voltage at said input terminal, or, if appropriate, until it is determined that the current supplied by said photovoltaic cell to said output terminal is either lower than the reference voltage divided by the maximum value of said plurality of resistance values, or higher than the reference voltage divided by the minimum value of said plurality of resistance values.

7. The measuring method according to claim 6, wherein said reference voltage is arranged to be sufficiently low for the current supplied by the photovoltaic cell at said reference voltage to be close or substantially equal to the short-circuit current of said photovoltaic cell.

8. The measuring method according to claim 6, wherein a dichotomy algorithm is implemented to select said initial resistance value and during successive selections of resistance values in said step D).

9. The measuring method according to claim 6, wherein any two successive values within said plurality of resistance values define a respective current range for the current supplied by the photovoltaic cell at said reference voltage, each of the current ranges thus defining a range of values for the luminous intensity able to be received or captured by said photovoltaic cell; and wherein the measuring method determines the value range corresponding to the luminous intensity actually received or captured by the photovoltaic cell.

10. The measuring method according to claim 6, wherein the method includes the following subsequent additional phases:
  E) Selecting said successive first resistance value or said second resistance value of the variable resistor determined in step D) and leaving the variable resistor connected to said input terminal of the measuring device;
  F) After a certain time interval, allowing the system to return to steady state, measuring the voltage at said input terminal by means of an analogue-digital converter and thereby accurately determining the value of the current supplied by said photovoltaic cell;
  G) Determining the value of the luminous intensity captured by the photovoltaic cell using the linear characteristic of luminous intensity as a function the short-circuit current for said photovoltaic cell.

* * * * *